US010872454B2

(12) United States Patent
Bates et al.

(10) Patent No.: US 10,872,454 B2
(45) Date of Patent: Dec. 22, 2020

(54) PANNING ANIMATIONS (75) Inventors: Megan A. Bates, Kirkland, WA (US); Song Zou, Bellevue, WA (US); Shaojie Zhang, Bellevue, WA (US); Ross N. Luengen, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/345,073

(22) Filed: Jan. 6, 2012

(65) Prior Publication Data

US 2013/0176316 A1 Jul. 11, 2013

(51) Int. Cl.
*G06T 13/80* (2011.01)
*H04W 52/02* (2009.01)
*G06T 13/20* (2011.01)
*G06F 3/0488* (2013.01)
*G06F 3/0485* (2013.01)

(52) U.S. Cl.
CPC ............ *G06T 13/80* (2013.01); *G06F 3/0485* (2013.01); *G06F 3/04883* (2013.01); *G06T 13/20* (2013.01); *H04M 2250/12* (2013.01); *H04W 52/027* (2013.01)

(58) Field of Classification Search
CPC ... H04L 69/32; H04L 67/12; G06F 17/30327; G06F 17/30548; G06F 3/0485; G06F 3/041; G06F 3/0418; G06T 13/20; G06T 13/00; G06T 13/80; G06N 3/0006; H04N 21/234318; H04N 21/8146; H04N 21/6125; H04N 21/4532; G02B 13/16; G06K 9/00214; H04W 12/08; H04W 52/027; G06Q 30/0242; B02C 21/02; B02C 23/02; H01L 31/02008; H01L 31/02363; H04M 2250/12
USPC .......................................................... 345/474
See application file for complete search history.

(56) References Cited

U.S. PATENT DOCUMENTS 5,682,489 A * 10/1997 Harrow et al. ............... 715/839
6,501,487 B1 * 12/2002 Taguchi ........................ 715/788
7,206,017 B1 * 4/2007 Suzuki .................. G06F 3/0485
345/629

(Continued)

FOREIGN PATENT DOCUMENTS

CN          1422054 A      6/2003
CN        102033698 A      4/2011

(Continued)

OTHER PUBLICATIONS

Gallagher, Matt, "Parametric acceleration curves in Core Animation", Retrieved at <<http://cocoawithlove.com/2008/09/parametric-acceleration-curves-in-core.html>>, Sep. 9, 2008, pp. 4.

(Continued)

*Primary Examiner* — Matthew Salvucci (57) ABSTRACT

Panning animation techniques are described. In one or more implementations, an input is recognized by a computing device as corresponding to a panning animation. A distance is calculated that is to be traveled by the panning animation in a user interface output by computing device, the distance limited by a predefined maximum distance. The panning animation is output by the computing device to travel the calculated distance.

20 Claims, 5 Drawing Sheets

(56) References Cited

U.S. PATENT DOCUMENTS

| | | | |
|---|---|---|---|
| 7,786,975 B2* | 8/2010 | Ording | G06F 3/04883 345/156 |
| 2006/0031786 A1 | 2/2006 | Hillis et al. | |
| 2006/0048071 A1* | 3/2006 | Jarrett | G06F 3/0485 715/784 |
| 2007/0013708 A1* | 1/2007 | Barcklay | G06F 17/30244 345/557 |
| 2007/0150830 A1* | 6/2007 | Ording | G06F 3/0481 715/784 |
| 2009/0122018 A1 | 5/2009 | Vymenets et al. | |
| 2010/0079498 A1 | 4/2010 | Zaman et al. | |
| 2010/0103118 A1 | 4/2010 | Townsend et al. | |
| 2010/0107068 A1* | 4/2010 | Butcher et al. | 715/702 |
| 2010/0115458 A1 | 5/2010 | Marano et al. | |
| 2010/0149188 A1 | 6/2010 | Roseborough et al. | |
| 2010/0208119 A1 | 8/2010 | Yoshimi et al. | |
| 2011/0090255 A1* | 4/2011 | Wilson | G06F 3/04817 345/647 |
| 2011/0164109 A1* | 7/2011 | Baldridge | H04N 13/257 348/43 |
| 2011/0202834 A1* | 8/2011 | Mandryk | G06F 3/04883 715/701 |
| 2011/0285722 A1 | 11/2011 | Kilgard et al. | |
| 2012/0154266 A1* | 6/2012 | Cho | 345/156 |
| 2012/0272181 A1* | 10/2012 | Rogers et al. | 715/784 |
| 2013/0050224 A1* | 2/2013 | Gehani | G06T 13/80 345/473 |

FOREIGN PATENT DOCUMENTS

| | | |
|---|---|---|
| CN | 102253744 A | 11/2011 |
| EP | 2017702 A1 | 1/2009 |
| JP | H10-198271 A | 7/1998 |
| JP | 2000293287 A | 10/2000 |
| JP | 2002064731 A | 2/2002 |
| JP | 2002196881 A | 7/2002 |
| JP | 2003162356 A | 6/2003 |
| JP | 3593827 B2 | 11/2004 |
| JP | 2006209373 A | 8/2006 |
| JP | 2007240889 A | 9/2007 |
| JP | 2009521754 A | 6/2009 |
| JP | 2010191585 A | 9/2010 |
| JP | 2011034502 A | 2/2011 |
| JP | 2011103044 A | 5/2011 |
| JP | 2012168890 A | 9/2012 |
| KR | 1020080040614 A | 5/2008 |
| KR | 1020080113913 A | 12/2008 |
| KR | 1020100047686 A | 5/2010 |
| KR | 1020110099413 A | 9/2011 |
| WO | 2011046766 A2 | 4/2011 |
| WO | 2011100599 A2 | 8/2011 |

OTHER PUBLICATIONS

"Animating with keyTimes and keySplines", Retrieved at <<http://msdn.microsoft.com/en-us/library/ms533119 (v=vs.85).aspx>>Retrieved Date: Dec. 27, 2011, pp. 9.

"Leaflet", Retrieved at <<http://leaflet.cloudmade.com/features.html>>, Retrieved Date: Dec. 27, 2011, pp. 3.

Kiriaty, Yochay, "MultiTouch Capabilities in Windows 7", Retrieved at <<http://msdn.microsoft.com/en-us/magazine/ee336016.aspx>>, Aug. 2009, pp. 7.

Weber, Benjamin T., "Mobile Map Browsers: Anticipated User Interaction for Data Pre-Fetching", Retrieved at <<http://www.library.umaine.edu/theses/pdf/WeberBT2010.pdf>>, A Thesis Submitted in Partial Fulfillment of the Requirements for the Degree of Master of Science, Dec. 2010, pp. 113.

"How can I compute the duration for a UIViewAnimationCurveEaseOut animation with a known starting velocity and distance?", Retrieved at <<http://stackoverflow.com/questions/1957342/how-can-i-compute-the-duration-for-a-uiviewanimationcurveeaseout-animation-with>>, Retrieved Date: Dec. 27, 2011, p. 1.

"International Search Report", dated Apr. 19, 2013, Application No. PCT/US2013/020419, Filed Date: Jan. 5, 2013, pp. 8.

The Extended EP Search Report dated Sep. 30, 2015 for European Patent Application No. 13733917.2, 7 pages.

CN Office Action Issued in Chinese Patent Application No. 201380004795.7, dated May 3, 2016, 7 pages.

Translated Chinese Office Action from CN Patent Application No. 201380004795.7, dated Jul. 19, 2016, 4 pages.

"Office Action Issued in Japanese Patent Application No. 2014-551380", dated Mar. 21, 2017, 5 Pages.

"Office Action Issued in Chinese Patent Application No. 201380004795.7", dated Jan. 19, 2017, 6 Pages.

"Office Action Issued in Chinese Patent Application No. 201380004795.7", dated Oct. 25, 2016, 8 Pages.

"Office Action Issued in Japanese Patent Application No. 2014-551380", dated Sep. 20, 2016, 5 Pages.

"Office Action Issued in Chinese Patent Application No. 201380004795.7", dated Aug. 2, 2017, 9 Pages.

"Office Action Issued in Japanese Patent Application No. 2014551380", dated May 15, 2018, 7 Pages.

"Office Action Issued in Japanese Patent Application No. 2014-551380", dated Nov. 13, 2018, 4 Pages. (Without English Translation).

"Office Action Issued in Korean Patent Application No. 10-2014-7018667", dated Apr. 19, 2019, 8 Pages.

"Office Action Issued in Korean Patent Application No. 10-2014-7018667", dated Oct. 30, 2019, 4 Pages.

* cited by examiner

302
Recognize an input by a computing device as corresponding to a panning animation

304
Calculate a distance that is to be traveled by the panning animation in a user interface output by computing device, the distance limited by a predefined maximum distance

306
Output the panning animation by the computing device to travel the calculated distance

402
Responsive to recognition of a first input as corresponding to a first panning animation, output the first panning animation to travel a first distance in a user interface output by a computing device, the first distance calculated by the computing device to be limited by a first predefined maximum distance

404
Responsive to recognition of a second input received during the outputting of the first panning animation as corresponding to a second panning animation, output the second panning animation to travel a second distance in the user interface output by the computing device, the second distance calculated by the computing device to be limited by a second predefined maximum distance that is greater than the first predefined maximum distance

PANNING ANIMATIONS

BACKGROUND

Users have a variety of different ways with which to navigate through a user interface. However, conventional techniques that were utilized to display movement corresponding to this navigation could be unpredictable and lead to an incomplete user experience.

For example, conventional techniques that involved animations to display movement through a user interface could be unpredictable. A user, for instance, may not be able to determine with regularity "where" the movement involved in the animation would "end up" in the user interface. This unpredictability could result in inefficient use of resources of the computing device. The user, for instance, may provide an input that causes the user interface to navigate past a desired location. Accordingly, the user may provide additional inputs to navigate back to a desired location, which could be time intensive, inefficient, and result in user frustration.

SUMMARY

Panning animation techniques are described. In one or more implementations, an input is recognized by a computing device as corresponding to a panning animation. A distance is calculated that is to be traveled by the panning animation in a user interface output by computing device, the distance limited by a predefined maximum distance. The panning animation is output by the computing device to travel the calculated distance.

In one or more implementations, responsive to recognition of a first input as corresponding to a first panning animation, the first panning animation is output to travel a first distance in a user interface output by a computing device. The first distance is calculated by the computing device to be limited by a first predefined maximum distance. Responsive to recognition of a second input received during the output of the first panning animation as corresponding to a second panning animation, the second panning animation is output to travel a second distance in the user interface output by the computing device. The second distance is calculated by the computing device to be limited by a second predefined maximum distance that is greater than the first predefined maximum distance.

In one or more implementations, a system includes a panning animation module implemented at least partially in hardware of a computing device and configured to output a panning animation responsive to recognition of one or more inputs detected by the computing device. The panning animation module includes a panning distance module configured to calculate a distance that is to be traveled by the panning animation in a user interface output by the computing device, the distance limited by a predefined maximum distance. The panning animation module also includes a panning time module configured to calculate an amount of time that is to be used to output the panning animation in the user interface output by the computing device, the amount of time limited by a predefined maximum time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional techniques that employed animations to show movement in a user interface (e.g., panning in response to a touch gesture) were often unpredictable. Thus, user interaction with these conventional techniques was often inefficient and could lead to user frustration.

Panning animation techniques are described. In one or more implementations, the panning animation techniques are configured to respond proportionally to a user's input, thereby giving the user a degree of predictability when interacting with a user interface that employs the techniques. These techniques may be configured to support a variety of different functionality. The techniques, for instance, may be configured to support a maximum distance and/or maximum time that is to be used to output the animation. The distance, for instance, may be based on an amount of a display area that is associated with a user interface that is to display the movement.

Additionally, the techniques may be used to separate the calculation of distance from time used for output of the animation. Movement, for instance, may be calculated based on a velocity associated with an input and use a deceleration rate to "slow down" the animation. An amount of time in which to output the animation may also be calculated. The distance and time may then be applied to an animation curve to perform the animation.

Further, the techniques may be configured to support successive inputs. The panning animation, for instance, may be output responsive to a touch input such as a "flick" gesture. During the output, a user may provide another input (e.g., another flick gesture) to continue the movement, move faster and/or further in a user interface, and so on. Accordingly, a maximum distance applied to the initial animation may be extended responsive to the subsequent input, thereby addressing the user's input. Further discussion of these and other techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
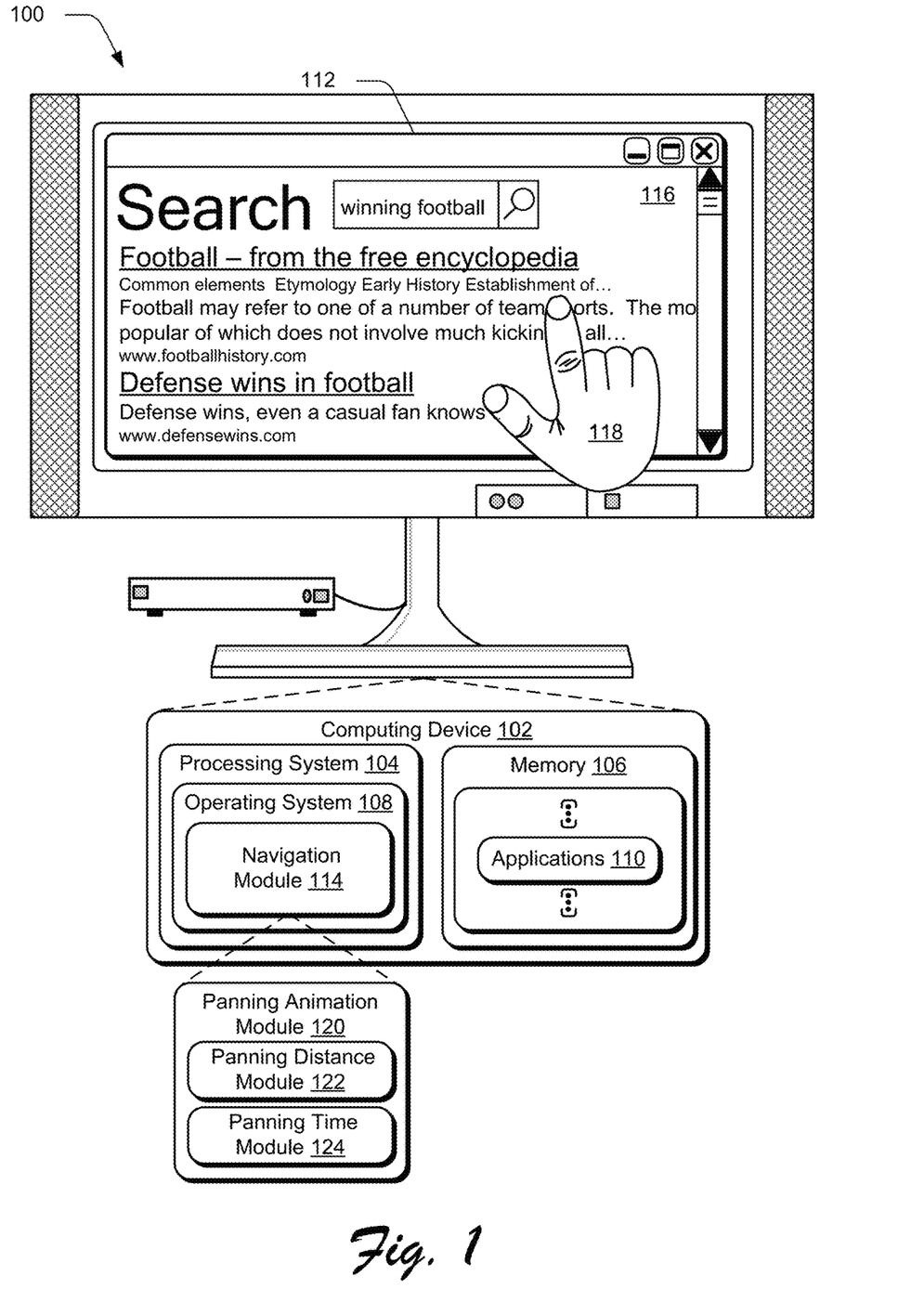
FIG. 1 is an illustration of an environment in an example implementation that is operable to employ panning animation techniques.

FIG. 1 is an illustration of an environment 100 in an example implementation that is operable to employ movement endpoint exposure techniques described herein. The illustrated environment 100 includes a computing device 102, which may be configured in a variety of ways. For example, the computing device 102 may be configured as a desktop computer, a mobile station, an entertainment appliance, a set-top box communicatively coupled to a display device, a wireless phone, a slate (e.g., a tablet), a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as a remote control and set-top box combination, an image capture device and a game console configured to capture gestures, and so on.

The computing device 102 is also illustrated as including a processing system 104 and memory 106. The processing system 104 is representative of functionality of the computing device 102 to perform one or more operations, such as through execution of instructions, configuration as one or more functional blocks, implemented "in silicon" such as through an application specific integrated circuit, and so on as further described in the discussion of modules below.

The computing device 102 is further illustrated as including an operating system 108. The operating system 108 is configured to abstract underlying functionality of the computing device 102 to applications 110 that are executable on the computing device 102. For example, the operating system 108 may abstract the processing system 104, memory 106, network, and/or display functionality (e.g., a display device 112) of the computing device 102 such that the applications 110 may be written without knowing "how" this underlying functionality is implemented. The application 110, for instance, may provide data to the operating system 108 to be rendered and displayed by the display device 112 without understanding how this rendering will be performed. The operating system 108 may also represent a variety of other functionality, such as to manage a file system and user interface that is navigable by a user of the computing device 102.

The operating system 108 is also illustrated as including a navigation module 114. The navigation module 114 is representative of functionality to navigate through a user interface 116 output for display on a display device 112. The illustrated user interface 116, for instance, is configured to include search results in an amount that is greater than can be displayed on the display device at any one time. Accordingly, the navigation module 114 may support techniques that may be used to navigate through the user interface 116 to view portions of interest.

This navigation may be performed in a variety of ways. For example, the computing device 102 may receive one or more inputs from a user, such as through detection of a gesture made by a user's hand 118. The gesture may be detected in a variety of ways, such as through touch functionality (e.g., of the display device 112 and/or track pad), detected using a camera, and so on. A variety of other inputs are also contemplated, such as through a keyboard, cursor control device (e.g., mouse), and other hardware devices.

Regardless of the input technique used, the navigation module 114 may initiate an animation to display movement in the user interface 116 responsive to identification of the input. An example of functionality that is configured to display movement is illustrated through use of a panning animation module 120. The panning animation module 120 is representative of functionality to configure and output a panning animation by the computing device 102 for display on the display device 112.

The panning animation module 120 is illustrated as including a panning distance module 122 and a panning time module 124. Thus, in this example the panning animation module 120 is configured to separate calculation of distance from time and thus may offer greater flexibility in the configuration of the panning animation. However, it should be readily apparent that a wide variety of other examples are also contemplated, such as to calculate distance and time together.

The panning distance module 122 is representative of functionality of the panning animation module 120 to calculate a distance that is to be traveled in the user interface 116 by the panning animation. Likewise, the panning time module 124 is representative of functionality of the panning animation module 120 to calculate an amount of time that is to be used to output the panning animation. Further discussion of operation of the panning animation module 120 and its corresponding panning distance module 122 and panning time module 124 may be found beginning in relation to the following figure.

Figure 2:
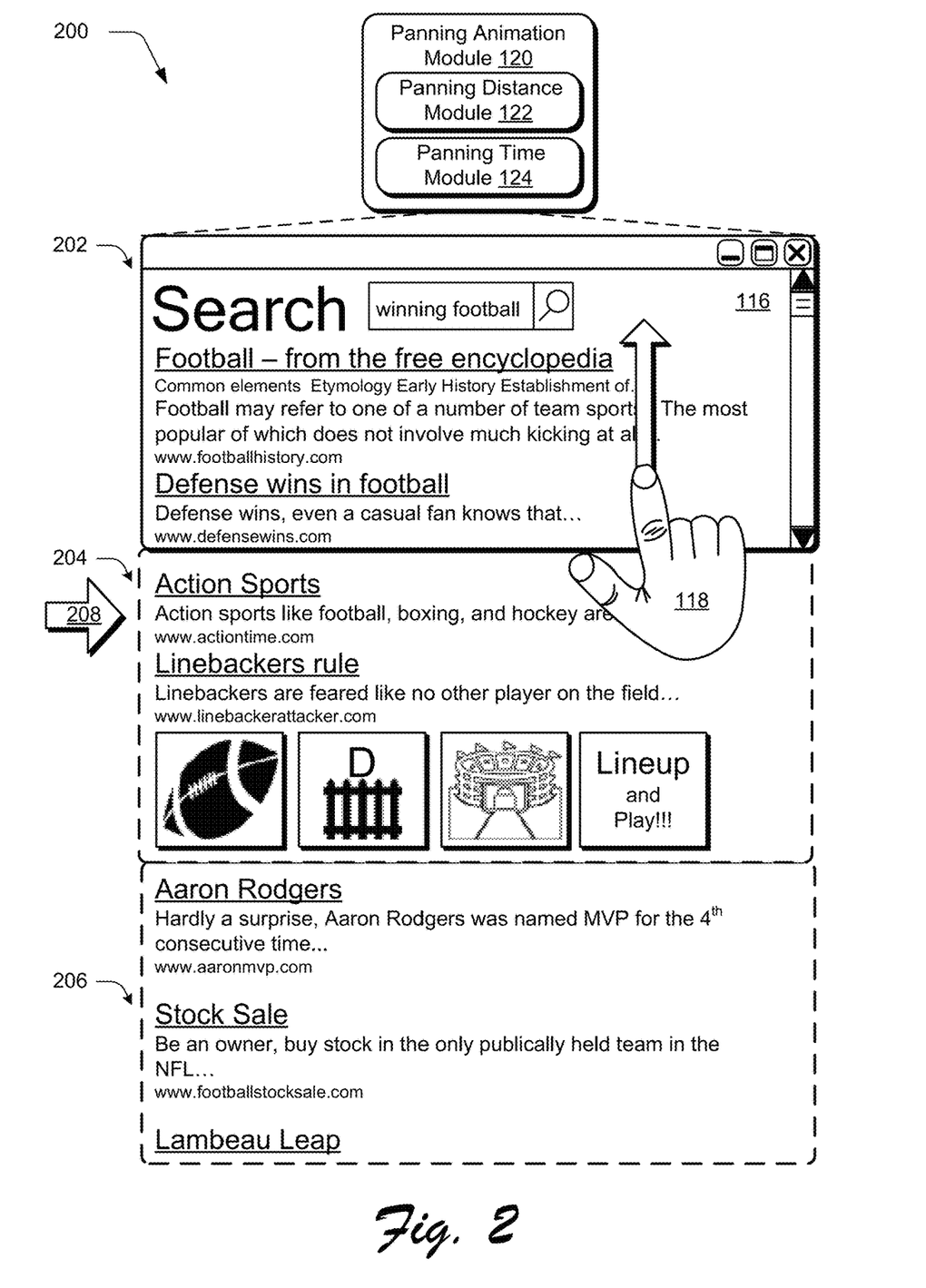
FIG. 2 is an illustration of an example implementation in which a user interface of FIG. 1 is shown in greater detail along with a panning animation module.

FIG. 2 is an illustration of an example implementation 200 in which the user interface 116 of FIG. 1 is shown in greater detail along with the panning animation module 120. The user interface 116 in this example is shown having first, second, and third sections 202, 204, 206. Each of these sections represents an amount of the user interface 116 that is displayable at any one point in time, e.g., in a current window and/or by the display device 112 at a given magnification.

The first section 202 is illustrated in a box as being currently displayed by the display device 112, whereas the second and third sections 204, 206 are illustrated in phantom. In this example, an input is received during the display of the first section 202. As previously described, this may be performed in a variety of ways, such as through use of a gesture that is detected using touch functionality of the display device 112. A variety of other examples are also contemplated, such as through use of an input device (e.g., a scroll wheel of a cursor control device), a keyboard, and so on.

The gesture, for instance, may involve placement of a finger of the user's hand 118 against the display device 112 and subsequent movement in a direction, which is the illustrated example involves vertical movement upward as illustrated through use of an arrow. The panning animation module 120 may be configured to recognize this movement as corresponding to a panning animation.

For example, the panning animation module 120 may initiate movement of the user interface 116 to follow movement of the finger of the user's hand 118 through output of a panning animation. The panning animation module 120 may also be configured to employ inertia such that output of the panning animation continues after the input as stopped such that the movement of the user interface 116 appears to have physical properties.

The panning animation module 120 may configure the panning animation in a variety of ways. For example, a velocity may be detected that corresponds to when the finger of the user's hand 118 was lifted from the display device 112. This velocity may then be used by the panning distance module 122 to calculate a distance that is to be traveled in the user interface 116.

In one or more implementations, the panning distance module 122 is configured to employ a predefined maximum distance as part of the calculation that is performed by the panning distance module 122. The panning distance module 122, for instance, may utilize the velocity of the input as described above to determine a distance that the user interface 116 is to move responsive to the input. A maximum distance may also be employed by the panning distance module 122 to limit the amount of movement in the user interface 116 that is permitted. For instance, if the initial calculation of the distance that corresponds to the input by the panning distance module 122 exceeds the maximum distance, the maximum distance is used as the distance that is to be moved in the user interface 116. Thus, the maximum distance may be used to provide predictability to the movement in the user interface 116.

The maximum distance may be defined in a variety of ways. For example, the maximum distance may be based on an amount of display area associated with the user interface 116. The panning distance module 212, for instance, may base the maximum distance on a multiple of the amount of display area, e.g., three-times the display area.

The display area that is to serve as a basis for the maximum distance may be defined in a variety of ways. This may include a size of a window of the user interface that is used to display the user interface as illustrated in the first section 202. This size may be based on an amount of a display environment currently consumed by the window, e.g., an amount of the window displayable by the display device 112. Therefore, in this example a portion of the window that is not currently displayed (e.g., is "off screen") is not used as a basis for the calculation. Other examples are also contemplated, such as a defined area of the window regardless of whether an entirety of the window is onscreen. A variety of other examples are also contemplated, such as to base this distance on an available display area of the display device 112, available display area of a display environment that leverages a plurality of display devices (e.g., a multi-monitor environment), and so on.

As previously described, the panning time module 124 is representative of functionality that is configured to calculate an amount of time in which to output the panning animation. The panning time module 124 may also configured to employ a predefined maximum time as part of the calculation, which may be used to further add predictability to user interaction with the user interface 116.

The panning distance module 122, for instance, may utilize the velocity of the input as described above to determine an amount of time that is to be used to display the movement as part of the panning animation. A maximum amount of time may also be employed by the panning time module 124 to limit the amount of time in the user interface 116 that is permitted to display the movement of the panning animation. For instance, if the initial calculation of the amount of time that corresponds to the input by the panning time module 124 exceeds the maximum amount of time, the maximum amount of time is used as the amount of time that is to be used to output the movement in the user interface 116. Thus, the maximum amount of time may also be used to provide predictability to the movement in the user interface 116. In one or more implementations, calculation of the amount of time may also be based on the calculation of the distance from the panning distance module 122.

The panning animation module 120 may be configured to accept the distance calculated by the panning distance module 122 and the time calculated by the panning time module 124 to configure the panning animation. The panning animation module 120, for instance, may apply these values to an animation curve to perform the panning animation. The panning animation may then be output to display movement through the user interface 116 for display by the display device 112.

Thus, the panning animation module 120 may use the panning distance module 122 to calculate a distance based on a velocity of an input and a deceleration value, up to a maximum distance. The panning time module 124 may calculate a time based on the velocity and a deceleration value (e.g., which may be a constant that is the same as or different from the deceleration value for the distance) up to a constant maximum amount of time.

A variety of different animation curves may be employed by the panning animation module 120 as part of configuration of the panning animation. For example, a cubic Bezier animation curve may be employed by the panning animation module 120 to travel over the calculated distance for the calculated amount of time. The cubic Bezier animation curve may thus be "stretched" or "compressed" to fit whatever distance and time is calculated. For example, a predefined cubic Bezier curve may be used that includes control points that are dynamically modified in order to approximate a velocity of the input, e.g., at an end of the gesture. This ensures the panning animation starts at an approximate velocity of the input, thereby smoothly continuing the user's motion.

Further, through use of the deceleration values the cubic Bezier animation curve may configure inertia involved in the panning animation to be performed relatively quickly at the start and then decelerate to "land" slowly at the ending. This may be used to support a variety of different functionality to aid user interaction with the user interface 116. For example, the panning animation may be configured to quickly move a significant portion of the distance to the destination of the animation in the user interface 116. This may make the panning animation appear to be performed relatively fast and predictable and thus the user is not forced to wait long for the animation to indicate the destination.

In another example, the slow landing allows the user to see and identify content located at the destination in the user interface 116 relatively quickly. In this way, the user is not forced to wait for the animation to fully stop before knowing if further panning is desired. This deceleration may also provide a feeling of physicality to the user interface 116 and thus reinforce a user experience in which the user interface 116 is an entity that may be touched and manipulated in a manner similar to that in the physical world.

Further, as described above the panning animation may employ a maximum distance based on a size of a display area associated with the user interface 116. This may be used to ensure that the user interface 116 is not accidentally panned too far by the user, e.g., in response to a flick gesture.

Further, the predictability of the distance may promote efficient use of resources of the computing device 102. For example, this distance limit may allow applications and system controls to plan for the distance achieved by the pan and react accordingly. For example, if the distance limit is three pages, the applications 110 may cache three pages of content to reduce the likelihood that the user is exposed to an empty screen while panning due to incomplete rendering by the computing device 102.

The panning animation module 120 may also be configured to address successive inputs. For example, when the user is panning multiple times in succession (e.g., one pan interrupts the inertia animation of the previous pan in the same direction), the maximum distance used to limit the distance for a pan by the panning distance module 122 may be increased. In this way, a user may cover larger distances in the user interface 116 efficiently.

For example, a first input may be received by the panning animation module 120 to cause the user interface to pan from the first section 202 to the second section 204 in the user interface. In response, the panning animation module 120 may begin movement of the user interface 116. This may be performed in a variety of ways, such as to display a scrolling animation in which parts of the second section 204 are moved "onscreen" for display on the display device 112 as parts of the first section 202 are moved "off screen." Thus, in this example, parts of the second section 204 are used to replace parts of the first section 202 during the animation.

As the animation to display the second section 204 is output for display on the display device 112, a second input may be received from a user to continue movement in the user interface 116. The second input may be the same as or different from the first input that was received to output the second section 204. In this example, the second input is also configured to cause the user interface 116 to pan in the same direction downward through the user interface 116.

The input is illustrated through use of an arrow 208 in relation to the user interface 116 to indicate a point at which the input was received in the output of the animation involving the display of the second section 204. For example, the referenced arrow indicates that a part of the second section 204 that includes "Action Sports" has been output for display by the display device 112. However, other parts of the second portion that are "below" the arrow have yet to be output.

In response, the panning animation module 120 may be configured to interrupt output of the inertia portion involved in the first animation, e.g., the portion of movement that does not follow the input in real time. Rather, the user interface 116 may be configured to follow the second input in real time, e.g., so that the user interface 116 is moved to match the second input, e.g., the movement of the finger of the user's hand 118.

Once this movement ceases (e.g., a finger of the user's hand 118 is lifted away from the display device), the panning animation module 120 may employ the panning distance module 122 and the panning time module 124 as before. However, in this instance the maximum distance that is predefined by the panning distance module 122 for the animation is increased in relation to the maximum distance used for the first animation, e.g., from three to five screens. Thus, in this example successive inputs may be employed to navigate further through the user interface 116 by the panning animation module 120 than if the inputs were addressed individually. Further discussion of these and other techniques may be found in relation to the following procedures.

Example Procedures

The following discussion describes panning animation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the example implementation 200 of FIG. 2.

Figure 3:
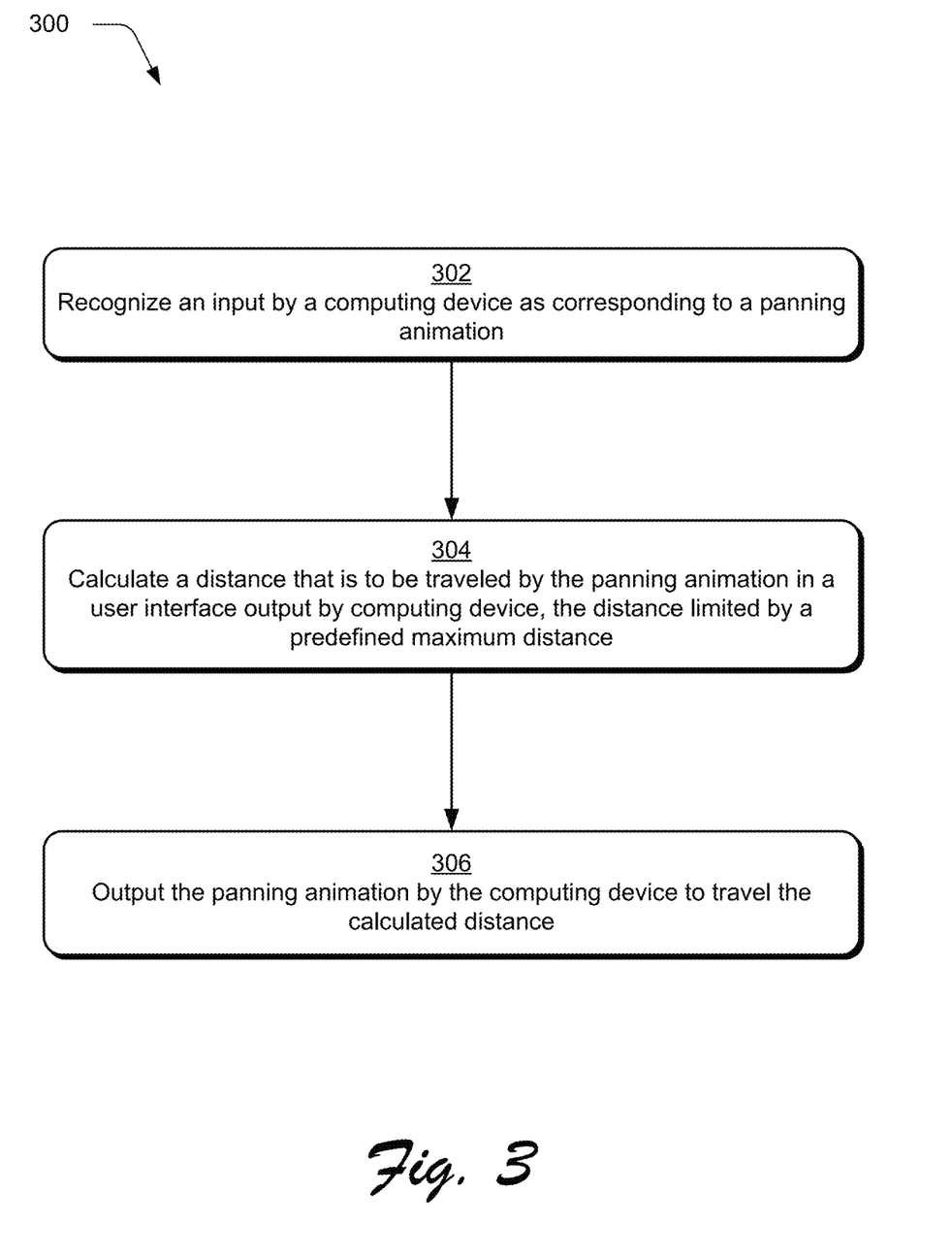
FIG. 3 is a flow diagram depicting a procedure in an example implementation in which a distance that is calculated for a panning animation is limited by a predefined maximum distance.

FIG. 3 depicts a procedure 300 in an example implementation in which a distance that is calculated for a panning animation is limited by a predefined maximum distance. An input is recognized by a computing device as corresponding to a panning animation (block 302). The input, for instance, may be a gesture detected using touch functionality or a camera, use of a cursor control device such as a scroll wheel of a mouse, and so on.

A distance is calculated that is to be traveled by the panning animation in a user interface output by computing device, the distance limited by a predefined maximum distance (block 304). The panning distance module 122, for instance, may calculate the distance based on a velocity of the input. Further, this distance may be limited by a maximum distance as previously described.

The panning animation is output by the computing device to travel the calculated distance (block 306). The panning animation, for instance, may be configured to include a display of inertia such that the movement continues after provision of an input stops, e.g., continues after a "flick" gesture. A variety of other examples are also contemplated.

Figure 4:
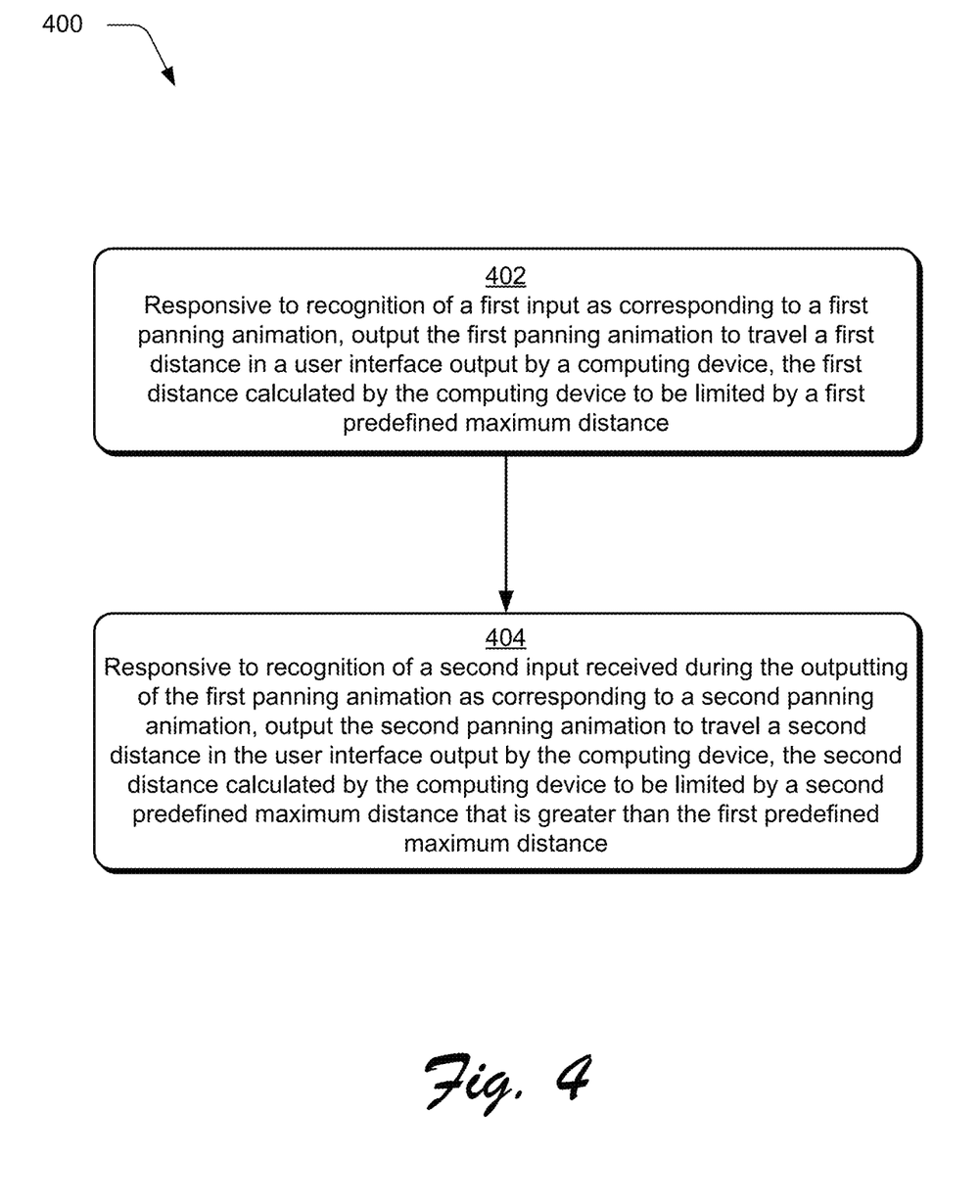
FIG. 4 is a flow diagram depicting a procedure in an example implementation in which successive inputs are used to navigate through an animation.

FIG. 4 depicts a procedure 400 in an example implementation in which successive inputs are used to navigate through an animation. Responsive to recognition of a first input as corresponding to a first panning animation, the first panning animation is output to travel a first distance in a user interface output by a computing device. The first distance is calculated by the computing device to be limited by a first predefined maximum distance (block 402). As before, the first distance may be calculated by the panning distance module 122 in a variety of ways, such as based on a velocity of the input or other characteristics of the input, e.g., a length of the input, an amount of time taken to provide the input, and so on.

Responsive to recognition of a second input, received during the output of the first panning animation, as corresponding to a second panning animation, the second panning animation is output to travel a second distance in the user interface output by the computing device. The second distance is calculated by the computing device to be limited by a second predefined maximum distance that is greater than the first predefined maximum distance (block 404). In this instance, the second input is received during output of the first animation. Accordingly, the panning distance module 122 may use a maximum distance for the second panning animation that is greater than the maximum distance used for the first panning animation. Thus, in this example inputs provided during the output of an animation may be used to travel further in the user interface 116 than if provided individually, i.e., were not output during the output of a previous animation.

Example System and Device

Figure 5:
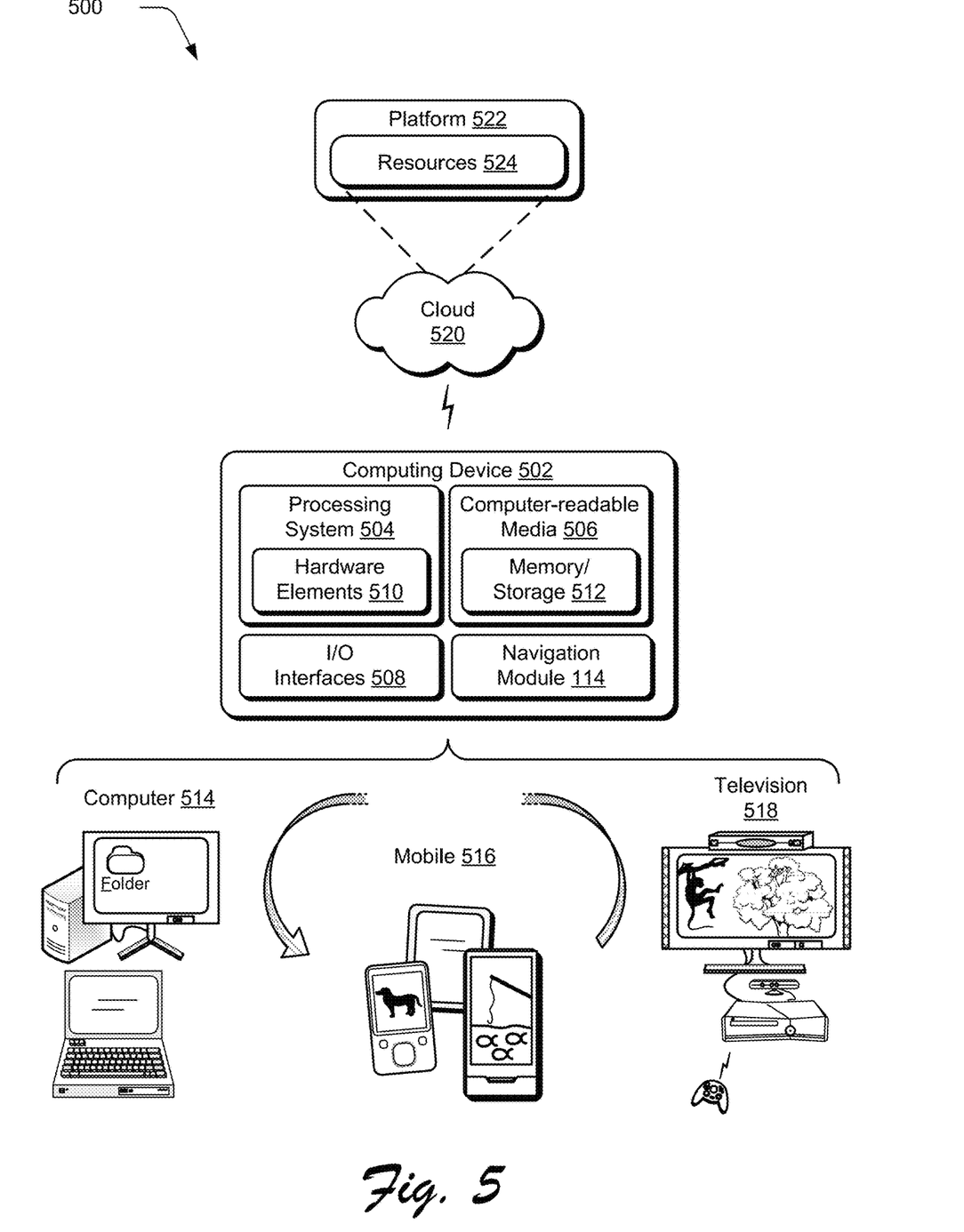
FIG. 5 illustrates an example system including various components of an example device that can be implemented as any type of computing device as described with reference to FIGS. 1 and 2 to implement embodiments of the techniques described herein.

FIG. 5 illustrates an example system generally at 500 that includes an example computing device 502 that is representative of one or more computing systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware element 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement as gestures that do not involve touch), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of instructions, modules, programmable device logic and/or fixed device logic implemented in a hardware form that may be employed in some embodiments to implement at least some aspects of the techniques described herein. Hardware may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware may operate as a processing device that performs program tasks defined by instructions, modules, and/or logic embodied by the hardware as well as hardware utilized to store instructions for execution, e.g., the computer-readable storage media described previously.

Combinations of the foregoing may also be employed to implement various techniques and modules described herein. Accordingly, software, hardware, or executable modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 502 may assume a variety of different configurations, such as for computer 514, mobile 516, and television 518 uses. Each of these configurations includes devices that may have generally different constructs and capabilities, and thus the computing device 502 may be configured according to one or more of the different device classes. For instance, the computing device 502 may be implemented as the computer 514 class of a device that includes a personal computer, desktop computer, a multi-screen computer, laptop computer, netbook, and so on.

The computing device 502 may also be implemented as the mobile 516 class of device that includes mobile devices, such as a mobile phone, portable music player, portable gaming device, a tablet computer, a multi-screen computer, and so on. The computing device 502 may also be implemented as the television 518 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein, as illustrated through inclusion of the navigation module 114. This functionality of the navigation module 114 may also be implemented all or in part through use of a distributed system, such as over a "cloud" 520 via a platform 522 as described below.

The cloud 520 includes and/or is representative of a platform 522 for resources 524. The platform 522 abstracts underlying functionality of hardware (e.g., servers) and software resources of the cloud 520. The resources 524 may include applications and/or data that can be utilized while computer processing is executed on servers that are remote from the computing device 502. Resources 524 can also include services provided over the Internet and/or through a subscriber network, such as a cellular or Wi-Fi network.

The platform 522 may abstract resources and functions to connect the computing device 502 with other computing devices. The platform 522 may also serve to abstract scaling of resources to provide a corresponding level of scale to encountered demand for the resources 524 that are implemented via the platform 522. Accordingly, in an interconnected device embodiment, implementation of functionality described herein may be distributed throughout the system 500. For example, the functionality may be implemented in part on the computing device 502 as well as via the platform 522 that abstracts the functionality of the cloud 520.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
recognizing, by a computing device, a first input corresponding to a first panning animation displayable in a displayed window on a user interface of the computing device;
calculating a first panning distance of the first panning animation based on the first input;
calculating a first limit on the first panning distance as a multiple of an amount of a display environment currently consumed by the displayed window;
limiting the first panning distance of the first panning animation by the first limit;
calculating an amount of time that is to be used to output the first panning animation, wherein the amount of time is limited by a predefined maximum time;
outputting the first panning animation by the computing device on the user interface, wherein the outputting comprises performing the first panning animation based on the first panning distance and the amount of time;
recognizing a second input received during the outputting of the first panning animation;
calculating a second panning distance of a second panning animation based on the second input;
calculating a second limit on the second panning distance, the second limit extending the first limit responsive to the second input being recognized as corresponding to continuing a movement of the first panning animation faster or further in the user interface by the second panning animation in a same direction as the first panning animation;
limiting the second panning distance of the second panning animation by the second limit; and interrupting the outputting of the first panning animation when the second input corresponding to the second panning animation is received, to output the second panning animation by the computing device to travel the second panning distance, wherein the amount of time that is to be used to output the second panning animation remains limited by the predefined maximum time.

2. The method as described in claim 1, wherein the first input is a touch input detected using touch functionality of the computing device.

3. The method as described in claim 1, wherein the first panning distance indicated by the first input is calculated based on a velocity associated with the first input.

4. The method as described in claim 1, wherein the outputting of the first panning animation includes applying a deceleration rate to a velocity associated with the first input to travel the first panning distance.

5. The method as described in claim 1, further comprising calculating a time that is to be used to perform the outputting of the first panning animation, the time limited by the predefined maximum time.

6. The method as described in claim 5, wherein the time is based on a velocity associated with the first input.

7. The method of claim 1, further comprising:
applying an animation curve to perform the first panning animation based on the first panning distance and the amount of time.

8. The method of claim 7, wherein the animation curve is a cubic Bezier animation curve.

9. The method of claim 1, wherein the first panning animation continues after a provision of the first input stops.

10. The method of claim 1, wherein the first limit is calculated irrespective of a size of a window that is not currently displayed on the user interface.

11. One or more non-transitory computer-readable storage media maintaining instructions that, when executed by one or more processors, cause the one or more processors to perform operations comprising:
recognizing, by a computing device, a first input corresponding to a first panning animation displayable in a displayed window on a user interface of the computing device;
calculating a first panning distance of the first panning animation based on the first input;
calculating a first limit on the first panning distance as a multiple of an amount of a display environment currently consumed by the displayed window;
limiting the first panning distance of the first panning animation by the first limit;
calculating an amount of time that is to be used to output the first panning animation, wherein the amount of time is limited by a predefined maximum time;
outputting the first panning animation by the computing device on the user interface, wherein the outputting comprises performing the first panning animation based on the first panning distance and the amount of time;
recognizing a second input received during the outputting of the first panning animation;
calculating a second panning distance of a second panning animation based on the second input;
calculating a second limit on the second panning distance, the second limit extending the first limit responsive to the second input being recognized as corresponding to continuing a movement of the first panning animation faster or further in the user interface by the second panning animation in a same direction as the first panning animation;
limiting the second panning distance of the second panning animation by the second limit; and
interrupting the outputting of the first panning animation when the second input corresponding to the second panning animation is received, to output the second panning animation by the computing device to travel the second panning distance, wherein the amount of time that is to be used to output the second panning animation remains limited by the predefined maximum time.

12. The one or more non-transitory computer-readable storage media of claim 11, wherein the operations further comprise:
applying an animation curve to perform the first panning animation based on the first panning distance and the amount of time.

13. The one or more non-transitory computer-readable storage media of claim 12, wherein the animation curve is a cubic Bezier animation curve.

14. A system comprising:
one or more processors; and
one or more computer-readable storage media maintaining instructions that, when executed by the one or more processors, cause the one or more processors to perform operations comprising:
recognizing, by a computing device, a first input corresponding to a first panning animation displayable in a displayed window on a user interface of the computing device;
calculating a first panning distance of the first panning animation based on the first input;
calculating a first limit on the first panning distance as a multiple of an amount of a display environment currently consumed by the displayed window;
limiting the first panning distance of the first panning animation by the first limit;
calculating an amount of time that is to be used to output the first panning animation, wherein the amount of time is limited by a predefined maximum time;
outputting the first panning animation by the computing device on the user interface, wherein the outputting comprises performing the first panning animation based on the first panning distance and the amount of time;
recognizing a second input received during the outputting of the first panning animation;
calculating a second panning distance of the second panning animation based on the second input;
calculating a second limit on the second panning distance, the second limit extending the first limit responsive to the second input being recognized as corresponding to continuing a movement of the first panning animation faster or further in the user interface by the second panning animation in a same direction as the first panning animation;
limiting the second panning distance of a second panning animation by the second limit; and
interrupting the outputting of the first panning animation when the second input corresponding to the second panning animation is received, to output the second panning animation by the computing device to travel the second panning distance, wherein the amount of time that is to be used to output the second panning animation remains limited by the predefined maximum time.

15. The system as described in claim 14, wherein the first panning distance is based on a velocity of the first input.

16. The system as described in claim 15, the operations further comprising:
applying the velocity and a constant deceleration rate to the first panning animation such that the first panning animation approximates the velocity of the first input initially and then decelerates according to the constant deceleration rate.

17. The system as described in claim 15, wherein the amount of time is based on the velocity of the first input.

18. The system as described in claim 17, the operations further comprising:
applying an animation curve to perform the first panning animation based on the first panning distance and the amount of time.

19. The system as described in claim 18, wherein the animation curve is a cubic Bezier animation curve.

20. The system of claim 14, wherein the first input is a touch input detected using touch functionality of the computing device.

* * * * *